United States Patent [19]

Chiodini

[11] Patent Number: 5,909,675
[45] Date of Patent: Jun. 1, 1999

[54] DEVICE FOR RECOGNIZING INFORMATION CONVEYED BY A RECEIVED SIGNAL

[75] Inventor: Alain Chiodini, Boulogne, France

[73] Assignee: Alcatel Mobile Communication France, Paris, France

[21] Appl. No.: 08/542,841

[22] Filed: Oct. 13, 1995

[30] Foreign Application Priority Data

Oct. 17, 1994 [FR] France .................................. 94 12353

[51] Int. Cl.⁶ .............................. G06F 15/18; G06K 9/62
[52] U.S. Cl. ........................................................... 706/20
[58] Field of Search .................................. 395/23, 20, 27, 395/22; 706/20

[56] References Cited

U.S. PATENT DOCUMENTS

| 5,271,036 | 12/1993 | Lobert et al. | 375/227 |
| 5,315,704 | 5/1994 | Shinta et al. | 706/20 |
| 5,423,001 | 6/1995 | Ueda | 329/372 |
| 5,490,505 | 2/1996 | Diab et al. | 600/323 |

OTHER PUBLICATIONS

Gustavo De Veciana et al, "Neural Net–Based Continuous Phase Modulation Receivers", *IEEE Transactions On Communications*, vol. 40, No. 8, Aug. 1992, pp. 1396–1408.

Giridhar et al, "Reduced Complexity MAPSD Algorithms with Spatial Diversity for TDMA Mobile Radio Signal Recovery", *IEEE International Conference On Communications, 1993*, May 23–26, 1993, pp. 1134–1138.

Joongho Choi et al, "A Progammable Analog VLSI Neural Network Processor for Communication Receivers", *IEEE Transactions On Neural Networks*, vol. 4, No. 3, May 1993, pp. 484–494.

*Primary Examiner*—Robert W. Downs
*Attorney, Agent, or Firm*—Sughrue, Mion, Zinn, Macpeak & Seas, PLLC

[57] ABSTRACT

For recognizing information conveyed by a received signal, represented by convention by possible elementary forms of the signal to be transmitted, a device includes a correlator for establishing a correlation between the received signal and various possible forms of signal, in accordance with the convention. A neural network using correlation coefficients obtained from the correlator is trained by application to its input of correlation coefficients corresponding to a received signal conveying given information whilst imposing the given information at its output. The network supplies recognized information.

4 Claims, 2 Drawing Sheets

DEVICE FOR RECOGNIZING INFORMATION CONVEYED BY A RECEIVED SIGNAL

BACKGROUND OF THE INVENTION

1. Field of the Invention

The present invention concerns a device for recognizing information conveyed by a signal received via a transmission channel and therefore likely to be affected by distortion and/or interference by the very fact of its transmission via that channel.

The present invention can be applied to digital information, i.e. information represented by convention by elementary forms of the signal to be transmitted each of which is defined for a duration equal to that of an information symbol.

The present invention is applicable to the demodulation of signals modulated using discrete modulation (such as FSK, MSK or GMSK modulation) and received via a radio transmission channel, for example a mobile radio channel.

Thus the present invention is applicable to receiving signals transmitted in a GSM (Global System for Mobile communications) type mobile radio system.

2. Description of the Prior Art

A signal received after transmission through a radio channel is degraded by the following phenomena:

variable attenuation due to losses (depending on the distance between the transmitter and the receiver) and the presence of obstacles along the transmission path (hills, buildings, vegetation, etc), multipath propagation caused by reflection or diffraction of the transmitted signal by various obstacles, the addition of noise (such as thermal noise), and interference due to others using the same resources (co-channel interference) or nearby resources (adjacent channel interference).

The Viterbi algorithm can be used for such demodulation (see, for example, pages 256–258 of "The GSM System for Mobile Communications" by Michel MOULY and Marie-Bernadette PAUTET). This algorithm reconstitutes the most likely sequence of symbols transmitted by making a number of hypotheses as to the possible signals and the noise characteristics.

The present invention concerns a device for recognizing information conveyed by a received signal that can be applied to the demodulation of signals conveying digital information received via a radio transmission channel, for example a mobile radio channel, this device being based on a different technique whereby such hypotheses can be dispensed with.

The present invention uses neural networks. The present invention is essentially directed to applying to a neural network used to recognize information conveyed by a received signal, rather than the received signal itself, parameters obtained from the signal that are the most pertinent to the task to be accomplished by the network and which therefore substantially reduce the complexity of the network and/or enhance the quality of recognition.

The GSM recommendations specify that the demodulator must be able to process a signal in the case of two equal power multipaths spaced by 16 μs. This is regarded as a limiting situation given the level of intersymbol interference that is generated and in this case equalization is required beforehand, this equalization necessitating an estimate of the impulse response of the transmission channel.

Another aspect of the invention lies in the simplification resulting from the fact that the two operations of equalization and demodulation usually carried out separately and successively, for example in a GSM receiver, can now be carried out in a single operation and the fact that the estimate of the impulse response of the transmission channel usually required to carry out said equalization operation is no longer needed.

A receiver for phase modulated signals (for example a GSM receiver) requires two channels in quadrature (called the I and Q channels) in order to be able to demodulate the signals. Another aspect of the invention lies in a further simplification due to the fact that only one of the two quadrature (I and Q) channels usually required in a demodulator for phase modulated signals (as in the GSM system mentioned above, in particular) is needed, although this does not prevent the use of two quadrature channels, in particular to implement a form of reception diversity.

SUMMARY OF THE INVENTION

Accordingly, the present invention consists in a device for recognizing information conveyed by a received signal, said information being represented by convention by possible elementary forms of the signal to be transmitted, said device including:

correlator means for establishing a correlation between the received signal and various possible forms of signal, in accordance with said convention, and a neural network using correlation coefficients obtained from said correlator means, said network being trained by application to its input of correlation coefficients corresponding to a received signal conveying given information whilst said given information is imposed at its output, said network supplying recognized information.

Other objects and features of the present invention will emerge from a reading of the following description of one embodiment given with reference to the appended drawings.

BRIEF DESCRIPTION OF THE DRAWINGS

FIGS. 1 and 2 are identified by the same reference numbers.

DETAILED DESCRIPTION OF THE PREFERRED EMBODIMENT

The present invention uses neural networks. A neural network is made up of a number of neurones. The neurone constitutes the unit of information processing and its structure is based on that of biological neurones. It has a number of inputs $x_i$ each of which is assigned a weighting coefficient $w_i$ (also called the synaptic weight). The values applied to the inputs are either direct (from the outside) or from outputs of other neurones. The neurone effects the sum of its inputs weighted by the corresponding synaptic weights:

$$e_j = \sum_{i=1}^{N} w_{i,j} \cdot x_i$$

The output is computed by applying to the resulting value a threshold function (step or sigmoid function):

$S_j=f(e_j)$

Neural networks are made up of a plurality of associated neurones. The links between the neurones define the topology of the network.

There is an infinite variety of possible architectures.

Nevertheless, two extreme types can be defined:

one in which the network is totally inter-connected: the output of each neurone activates all the other neurones; this constitutes a recursive network, one in which the network is arranged in successive layers; unlike the recursive network, there is no retro-action. An input layer receives signals from outside and an output layer delivers the response of the network. There can be a number of intermediate layers between these two layers.

The principle of using a neural network is to present a set of values to the input and to observe the result at the output. The transit time of information through the network is very short, especially in the case of multilayer networks.

The main features of the neural network approach are:

it is intrinsically parallel: the neurones calculate their state simultaneously, yielding very high processing power, it is highly connective: the density of connections between neurones is very high, it is very rugged: the knowledge characterizing the application being distributed throughout the synaptic weights during the training process, subsequent failure of one or more neurones does not cause failure of the system, it has a training faculty: the synaptic weights are determined by a training mechanism during which sets of values are applied in succession to the input of the network with a required response imposed at the output.

A gradient backpropagation algorithm then adjusts the synaptic coefficients from the output layers back to the input layer.

Figure 1:
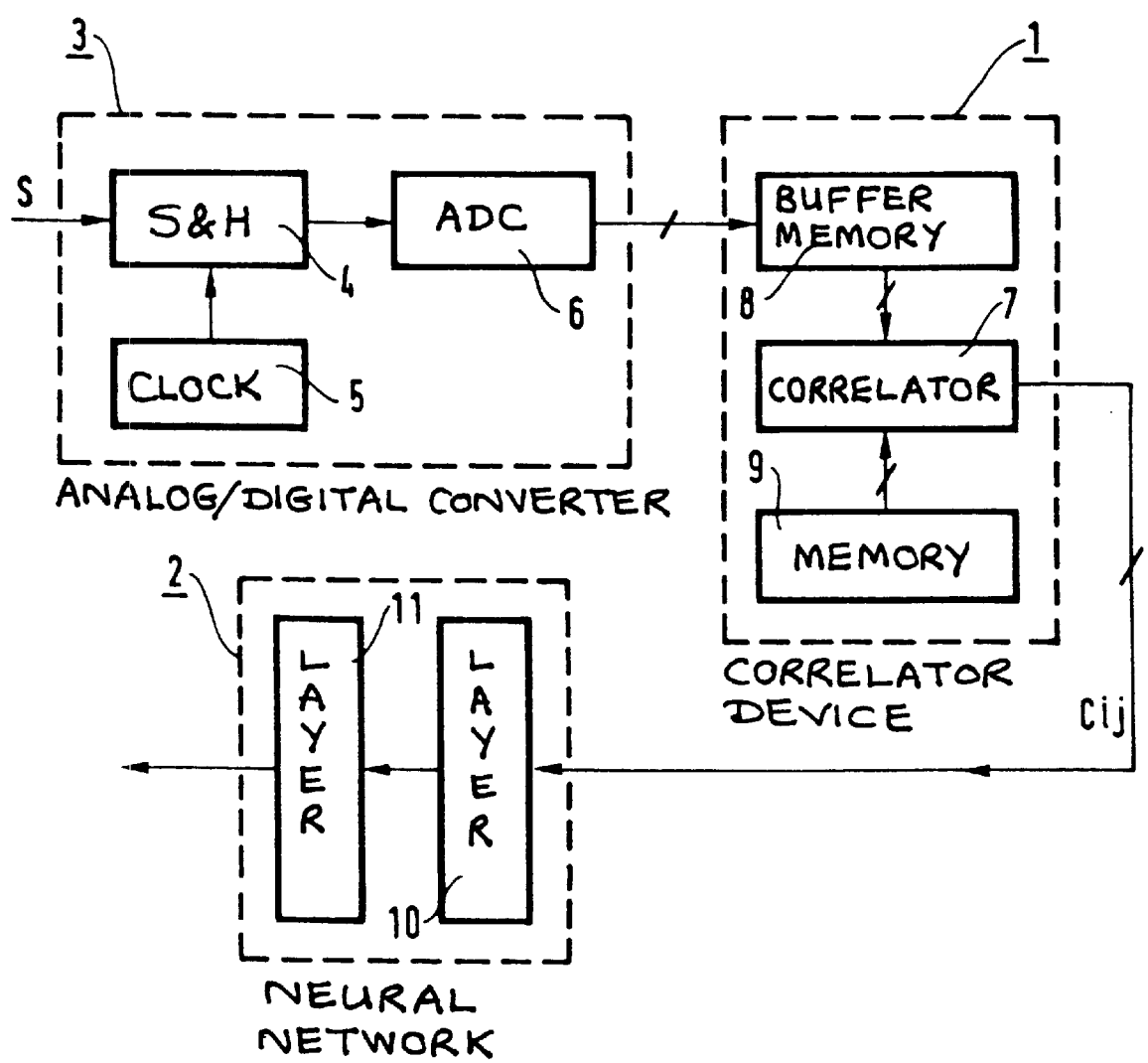
FIG. 1 shows one embodiment of a device in accordance with the invention for recognizing information conveyed by a received signal.

The information recognizing device shown in FIG. 1 is used, for example, to demodulate a signal conveying digital information received over a mobile radio channel in a mobile radio system of the GSM type. A GSM system uses GMSK (Gaussian Minimum Shift Keying) modulation.

The device shown in FIG. 1 operates on a signal S which is a signal transposed in frequency obtained from the output of one of the two quadrature (I and Q) channels of a first receiver stage that is not shown because it does not constitute any part of the present invention.

This device essentially comprises:

correlator means 1 to establish a correlation between the received signal and various possible forms of the received signal over a period equal to n information symbols (the various possible forms are stored beforehand), a neural network 2 operating on the correlation coefficients from the correlator means 1.

In this example the correlator means 1 operate on digital samples obtained after the signal S passes through analog/digital converter means 3.

The analog/digital converter means 3 include:

a sample and hold circuit 4 receiving a clock signal at frequency $f_e$ from a clock 5, an analog/digital converter proper 6 operating on samples from the sample and hold circuit 4.

The GSM system of this example is a time-division multiple access system and so the recognition device processes the received signal burst by burst, each burst including a sequence of information symbols transmitted in one of the time slots of a time-division multiplex structure characteristic of this system.

In this example, the correlator means 1 calculate the correlation coefficients by means of a correlator 7 which applies to the samples forming a burst of the received signal, stored in a buffer memory 8, a sliding window of width equal to n information symbols and calculating, over a time period equal to n information symbols, for each of I positions of the sliding window and for each of J possible forms of the received signal stored in a memory 9, the corresponding intercorrelation coefficient Cij (with i varying between 1 and I and j varying between 1 and J).

The set of intercorrelation coefficients Cij obtained in this example for a burst can be stored in a rectangular matrix of J rows by I columns.

A traffic burst in the GSM system includes 148 information symbols or bits divided into five fields:

the header: three fixed bits (0 0 0), the first half of the information sequence to be transmitted: 58 bits (value 0 or 1), the training sequence: 26 bits (there are eight possible sequences), the second half of the information sequence to be transmitted: 58 bits (value 0 or 1), the appendix: three fixed bits (0 0 0).

The three bits at the start and end of a burst are provided to prevent loss of efficiency of the demodulator when processing the information bits at the ends of the burst.

In the present example, observing a burst of this kind through a sliding window n bits wide reveals a number I of n-tuplets equal to 149−n.

The value chosen for n usually represents a compromise between:

greater accuracy, obtained by increasing the value n, the limiting case in this example being a value of n equal to 148, in which case the precise one of the J possible forms of the received signal most closely resembling the signal actually received for the given burst of 148 bits can be found, greater simplicity, obtained by decreasing the value n, which reduces the number of possible forms of the received signal over a time period equal to n information symbols.

When n is chosen to be less than the value 148, the set of n-tuplets observed nevertheless shows some redundancy, enabling a meaningful representation of the burst.

In this example the value of n could be chosen between 2 and 5, inclusive, for example.

The sequence of information symbols associated with a traffic burst necessarily beginning and ending with three bits at 0, the most appropriate analysis pattern could be the quadruplet (i.e. n=4), in which case the observation of a burst reveals 145 quadruplets.

Accuracy can also be increased by using oversampling analog/digital converter means 3. The sampling frequency is then equal to N times (with N=6, for example) the symbol frequency or bit rate of the digital information conveyed by the signal S. In the GSM system the symbol frequency is 270.833 kHz.

The set of intercorrelation coefficients Cij obtained for a burst can then be stored in a rectangular matrix of J rows by N×145 columns.

GSMK modulation has a "memory" aspect, i.e. the form (in this instance the phase) of the signal over a symbol period depends not only on the value of the information symbol in that symbol period but also on the value of information symbols in preceding symbol periods. In this case the total number of possible forms of the received signal over a time period equal to n information symbols is greater than $2^n$. In the case of modulation with no memory aspect, such as FSK modulation, for example, it is equal to $2^n$.

In the case of modulation with a memory aspect, and in particular in the case considered here of GMSK modulation, the number J of possible forms considered can nevertheless be chosen as equal to $2^n$ by considering each of the possible signal forms obtained:

by applying GMSK modulation to one of the $2^n$ possible sequences obtained with n symbols, preceded by symbols having the same value as the first symbol of the sequence, and followed by symbols having the same value as the last symbol of the sequence, and then by isolating the portion of the modulated signal obtained in this way that corresponds to these n symbols.

This simplifies the implementation in the case where the total number of possible forms is too large.

In this case, and in the numerical example considered here, the matrix of correlation coefficients is one of $2^4=16$ rows by 6×145=870 columns.

Given the sampling frequency used (six times the bit rate in this example) this matrix can be divided into 145 rectangular 16×6 matrices.

In the application under consideration, intersymbol interference due to the transmission channel can affect up to five consecutive bits. To decide the value of a bit the neural network 2 must therefore have a matrix input corresponding to five consecutive 16×6 sub-matrices constituting a 16×30 matrix.

The sub-matrices can be decimated by retaining only one column in six. This yields a simpler network the input of which is a 16×5 matrix. The main matrix becomes a 16×145 matrix to which a 16×5 sliding window is applied to demodulate the 145 bits constituting the burst.

The neural network 2 is a network with two layers 10 and 11, for example. This network is trained by means of the prior art techniques, as referred to hereinabove.

In the application to recognizing information conveyed by a received signal after transmission via a radio transmission channel, the configuration provided to enable this training entails, for example, measuring or simulating the behaviour of the radio channel on the basis of given transmitted information to obtain a corresponding received signal, calculating correlation coefficients for that signal and presenting the correlation coefficients obtained in this way to the input of the network, while imposing the required response, namely said given transmitted information, at the output of this network.

Another method, usable when a training sequence is inserted into the transmitted information (as in the GSM system, for example) is to use a training sequence of this kind to enable continuous and adaptive training of the neural network.

The training sequence is known to the receiver and constitutes the response to be imposed on the output of the network, as the required response, for the corresponding portion of the modulated signal received, and therefore for the corresponding correlation coefficients, applied at this time to the input of the network.

Adaptive training of the network using the training sequence could be carried out either after demodulation of the portions of the modulated signal received corresponding to the two halves of the information sequence surrounding a training sequence (and thus during the period between reception of two successive bursts in the case of a time-division multiple access system) or, for improved quality of demodulation, before demodulation of these two portions of the signal (provided that they are memorized first).

Figure 2:
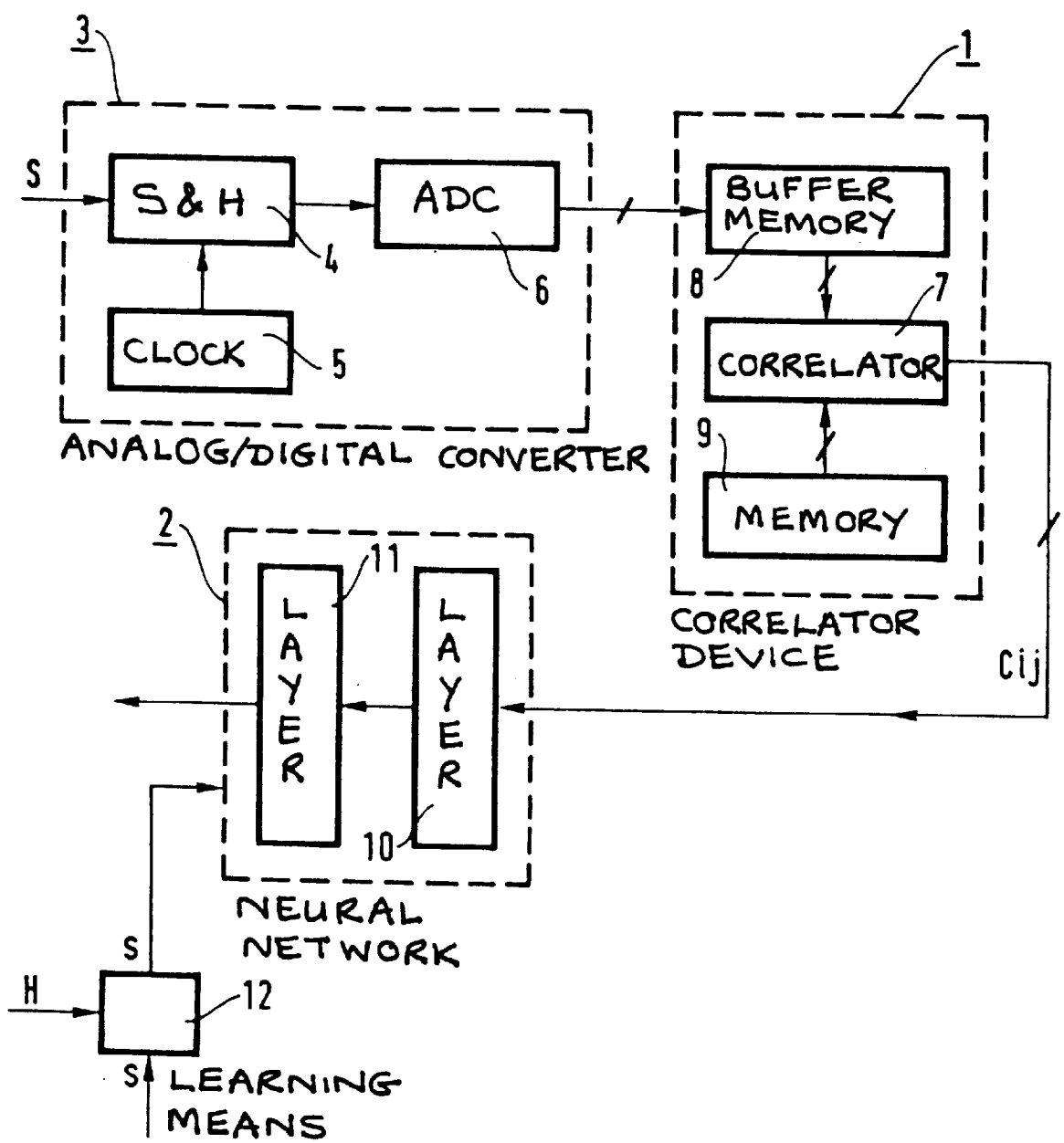
FIG. 2 is a diagram illustrating one method by which a neural network can be trained in a device in accordance with the invention; for simplicity, elements common to both

FIG. 2 shows this method of training, in which training means 12 impose the training sequence s on the output of the neural network 2 when the correlation coefficients from the correlator means 1 relate to the time positions occupied by the training sequence in the received signal. To this end the training means 12 are controlled by clock signals H indicating these time positions.

Note that the role of the training sequence in this method is different from its role in prior art systems, in which it is used to estimate the impulse response of the transmission channel, as briefly mentioned above.

There is claimed:

1. A device for recognizing information conveyed by a received signal, said information being represented by convention by possible elementary forms of the signal to be transmitted, said device including:

correlator means for establishing a correlation between said received signal and at least some of said possible elementary forms of said signal and generating correlation coefficients, and a neural network receiving correlation coefficients from said correlator means and generating at its output recognized information conveyed by said received signal, said network being trained by application to its input of correlation coefficients, which coefficients have been generated by said correlator means upon receipt by said correlator means of a received signal conveying given information whilst imposing said given information at the output of said neural network.

2. The device according to claim 1 further including training means for continuous and adaptive training of the neural network by means of a training sequence comprising said given information and inserted into said information.

3. The device according to claim 1, for demodulating signals modulated by means of modulation with a memory aspect, wherein each of said various possible signal forms over a time period equal to n information symbols is obtained by:

generating a modulated sequence signal by applying said modulation to a modulation sequence, said modulation sequence including one of $2^n$ possible sequences of said n information symbols, preceded by a plurality of symbols having the same value as the first symbol of said one sequence and followed by a plurality of symbols having the same value as the last symbol of said one sequence, and thereafter isolating the portion of the modulated sequence signal that corresponds to said n information symbols.

4. The device according to claim 1, wherein said recognized information comprises a demodulation product of said received signal.

* * * * *